(12) United States Patent
Diaz Fuente

(10) Patent No.: US 7,711,032 B2
(45) Date of Patent: May 4, 2010

(54) METHOD, TRANSMITTER AND RECEIVER FOR SPREAD-SPECTRUM DIGITAL COMMUNICATION BY GOLAY COMPLEMENTARY SEQUENCE MODULATION

(75) Inventor: Vicente Diaz Fuente, Alcala De Henares (ES)

(73) Assignee: Vicente Diaz Fuente, Madrid (ES)

( * ) Notice: Subject to any disclaimer, the term of this patent is extended or adjusted under 35 U.S.C. 154(b) by 949 days.

(21) Appl. No.: 10/344,426

(22) PCT Filed: Apr. 27, 2001

(86) PCT No.: PCT/ES01/00160

§ 371 (c)(1),
(2), (4) Date: Feb. 12, 2003

(87) PCT Pub. No.: WO02/17585

PCT Pub. Date: Feb. 28, 2002

(65) Prior Publication Data

US 2003/0179811 A1    Sep. 25, 2003

(30) Foreign Application Priority Data

Aug. 16, 2000    (ES)    ................... 20002086

(51) Int. Cl.
*H04B 1/69*    (2006.01)
(52) U.S. Cl. .................................... 375/146
(58) Field of Classification Search ................ 375/146, 375/343, 130, 140, 147, 141, 142, 145, 149, 375/150, 148
See application file for complete search history.

(56) References Cited

U.S. PATENT DOCUMENTS 3,681,579 A * 8/1972 Schweitzer ................. 708/426
3,751,596 A * 8/1973 Tseng ........................ 370/203

(Continued)

FOREIGN PATENT DOCUMENTS

EP    0952461    10/1999

(Continued)

OTHER PUBLICATIONS

Cornelia et al., "A Construction of OFDM 16-QAM Sequences having Low Peak power," IEEE,Tranbsaction on Inforamtion Theory, vol. 47, No. 5, Jul. 2001, pp. 2091-2094.*

(Continued)

*Primary Examiner*—Tesfaldet Bocure
(74) *Attorney, Agent, or Firm*—Marshall, Gerstein & Borun, LLP

(57) ABSTRACT

The frequency spectrum of a transmitter system is spreaded in the transmitter (1) through the codification of information bits by means of sequence pairs of Golay complementary sequences. The spectrum is received in the receiver (2) and is subject to a filter, which is adapted to the features of such sequences enabling the detection of digital levels corresponding to the original transmitted information. If pairs of orthogonal sequences, A amplitudes for moduling data, and N-PSK modulation are used, it is possible to get a transmission speed (C) equal to:

Where B is to the null-to-null spread bandwidth used in Hertz. It allows an improvement in quality as compared to other digital-communication systems, which use spread spectrum techniques and CDMA, obtaining a process gain independent of the transmission speed.

17 Claims, 3 Drawing Sheets

U.S. PATENT DOCUMENTS

| | | | | |
|---|---|---|---|---|
| 3,889,065 A | * | 6/1975 | Alsup | 370/479 |
| 5,353,110 A | * | 10/1994 | Jones | 356/73.1 |
| 5,668,795 A | * | 9/1997 | Magill et al. | 370/209 |
| 6,095,977 A | | 8/2000 | Hall et al. | 600/443 |
| 6,301,221 B1 | * | 10/2001 | Paterson | 370/208 |
| 6,452,958 B1 | * | 9/2002 | van Nee | 375/130 |
| 6,487,258 B1 | * | 11/2002 | Jedwab et al. | 375/340 |
| 6,567,482 B1 | * | 5/2003 | Popovic' | 375/343 |
| 6,567,487 B1 | * | 5/2003 | Pilz | 375/360 |
| 7,039,036 B1 | * | 5/2006 | Dabak et al. | 370/342 |
| 7,062,002 B1 | * | 6/2006 | Michel et al. | 375/354 |

FOREIGN PATENT DOCUMENTS

| | | |
|---|---|---|
| JP | 09093295 A | 4/1997 |

OTHER PUBLICATIONS

Golay, "Complementary Series", *IRE Transaction of Information Theory*, Apr. 1961, pp. 82-87.

Popovic, B.M. "Efficient Golay correlator". Electronics Letters, vol. 35, Issue 17, Aug. 19, 1999 pp. 1427-1428.

\* cited by examiner

METHOD, TRANSMITTER AND RECEIVER FOR SPREAD-SPECTRUM DIGITAL COMMUNICATION BY GOLAY COMPLEMENTARY SEQUENCE MODULATION

BACKGROUND OF THE INVENTION

The present invention refers to the modulation and demodulation method, as well as the transmitter and receiver which makes it possible to transmit and receive data by means of any transmission means, particularly when it is necessary or preferable to use spread spectrum techniques.

The spread spectrum concept was developed for use in military communications due to its immunity features towards noise and interference. Its principle is based on the use of certain binary sequences having certain features similar to noise and which, however, a receiver which knows said sequence is capable to detect as a signal. In the same manner, the compression of impulses by means of binary sequences is useful also in RADAR, SONAR, and echography applications since it allows to improve the resolution of the detected objects. However, in recent years its use has become widespread in space applications and civil communications such as mobile telephony, DS-CDMA (Direct Sequence Code-Division Multiple Access), radio telephone access loops, Internet access, wireless local area networks, deep space communications, etc. all of which are based on digital modulation by means of using sequences which are suitable for this type of applications due to their autocorrelation and cross-relation features. Therefore international organisations (IEEE, UIT, etc.), have begun normalising and standardising modulation systems which facilitates the use of certain sequences to modulate the transmitted binary data and thus obtain characteristics which makes it possible to use, among others, certain frequencies reserved for industrial, scientific and medical applications (ISM bands) and whose use and exploitation do not require any kind of administrative license. The need to send as much information as possible with the same bandwidth has made the telecommunications industry to develop commercial applications which use the IEEE 802.11 standard for the transmission of information by radio in local networks obtaining increasingly higher speeds by means of the use of binary sequences such as the 11-bit Barker (to obtain a minimum processing gain of 10.4 dB) or 8-bit Walsh, and different modulation techniques (BPSK, QPSK, MBOK, QMBOK, etc.) which makes it possible to attain transmission speeds of up to 11 Mbps. This standard makes it possible to work within three frequency bands with a null-to-null bandwidth of 22 MHz, in the so-called 2.4 GHz band.

Likewise, reliable transmission methods are needed for the so-called deep space communications between spaceships and the bases on Earth, allowing a big processing gain due to the need to limit the emission power of the ship's transmission equipment, and due to the reduced signal to noise ratio of said signals when they are received.

In the present applications (FIG. 1) the length of the coding sequence (Barker, PN, Walsh, etc.) determines both the processing gain and the bandwidth used. Generally, the transmission speed will be reduced if we attempt to increase the processing gain, which is why a compromise between the two parameters must always be found. The transmission speed may be increased by increasing the number of modulation phases, however, the restrictions of this technique increase with the decrease in the signal to noise ratio during reception.

Based on the above it can be deduced that there is a need for a spread spectrum digital modulation technique which on the one hand makes it possible to increase transmission speed and on the other to obtain a bigger processing gain to make it possible to reduce the needed transmission power or improve the signal to noise ratio during reception, and at the same time to reduce the complexity of the present modulation tables.

No patent or utility model whatsoever is known whose features are the object of the present invention.

BRIEF SUMMARY OF THE INVENTION

The present invention uses pairs of Golay complementary sequences for the modulation by means of spread spectrum and DS-CDMA of the amplitude modulated binary data in combination with an N-PSK modulation widely used in digital communication systems.

The main property of the sequences used in this invention is that in contrast to the Barker sequences, which have side lobes, the Golay sequences are characterised by an ideal autocorrelation, that is, they correspond to a perfect Kronecker delta so that they meet:

$$C_A[n]+C_B[n]=\{2M, n=0$$

$$\{0, n \neq 0$$

where $C_A$ and $C_B$ are the individual autocorrelations of A and B sequences of the pair of selected Golay complementary sequences, M length; and whose values belong to the bivalued set $(1, -1)$.

The generation of such sequences is based on the so-called kernel basics of 2, 10 and 26 bits, known hitherto (the rules of Golay sequence generation are discussed in the article called "Complementary Sequences" by M. J. E. Golay, published in IRE Transactions on Information Theory, vol. IT-7, pp. 82-87, April 1961).

The communication system object of the present invention makes it possible to establish a physical end-to-end or end-to-multipoint connection at a transmission rate, which will depend on the employed means and on the available bandwidth and on the acceptable error rate.

It consists of two pieces of equipment or devices: One is a transmitter and the other one is a receiver.

The transmitter equipment is used to perform the following tasks:

Receive the data and generate the symbols corresponding to each group of (m) bits as a function of the Golay sequence number ($\eta$) of the selected length (M), number of amplitudes (A) per symbol, number of phases (N) used for the modulation and processing gain needed to comply with the quality requirements of the system.

Carry out the adding up of the different phases to form an N-PSK modulation and thus generating the transmission signal.

Transmit the composite signal to the transmitter means for example by means of an RF stage and antenna.

The receiver equipment is used to perform the following operations:

Demodulate the N-PSK information and extract the components of each of the different phases.

Adapt, filter and correlate the extracted components with their corresponding complementary pairs or Golay.

Sum up the correlations and thus obtain the original data stream as digital levels.

Perform the level decoding to obtain the original data.

The first advantage of this method is that of being able to obtain as big a processing gain as one wishes, independently, as will be seen later, of the transmission rate, and only by increasing the length of the selected Golay sequences, for which reason high transmission power is not needed to obtain a high signal to noise ratio during reception. The processing gain (in decibel) in this case is defined as:

$$GP = 10 \log_{10}(2M) dB$$

where M corresponds to the length of the Golay sequences used in the modulation. This feature is very important in applications where a low transmission power is desired (portable terminals, space ships and communication satellites), the communication is performed over great distances (deep space transmissions), and even military applications in which the interferences caused by the enemy or the need to encrypt the transmission determine the security and quality of the communication.

Furthermore, this method makes it possible to transmit simultaneous information flows in the same frequency bands over the channel by means of using η different low cross-correlation Golay sequences, thus facilitating the creation of η communication sub networks within a same band, or to multiply the transmission rate by a factor proportional to η.

Likewise, it is possible to increase the transmission rate even more if a prior amplitude modulation of the entry data by means of A amplitudes is performed.

Therefore, from the aforementioned it can be deduced that the transmission speed or capacity (C), that can be obtained in a spread spectrum communication system using this method will be:

$$C = \eta \log_2 A \frac{1}{2} \log_2 N \frac{B}{2} \text{ bits/seg}$$

Where B (Hertz) is the null-to-null bandwidth used, N is the number of phases used in the modulation (power of 4), A is the number of amplitudes used in the binary data encoding and η is the number of pairs of Golay complementary sequences used. In the previous expression it is observed that C is independent of M.

Therefore, the described invention constitutes a powerful communication system for use in spread spectrum applications, DS-CDMA, hostile environments, when restrictions on the transmission power exists, or simply when there is a wish to improve the quality of the communication without a transmission rate degradation.

DETAILED DESCRIPTION OF THE INVENTION

Figure 1A:
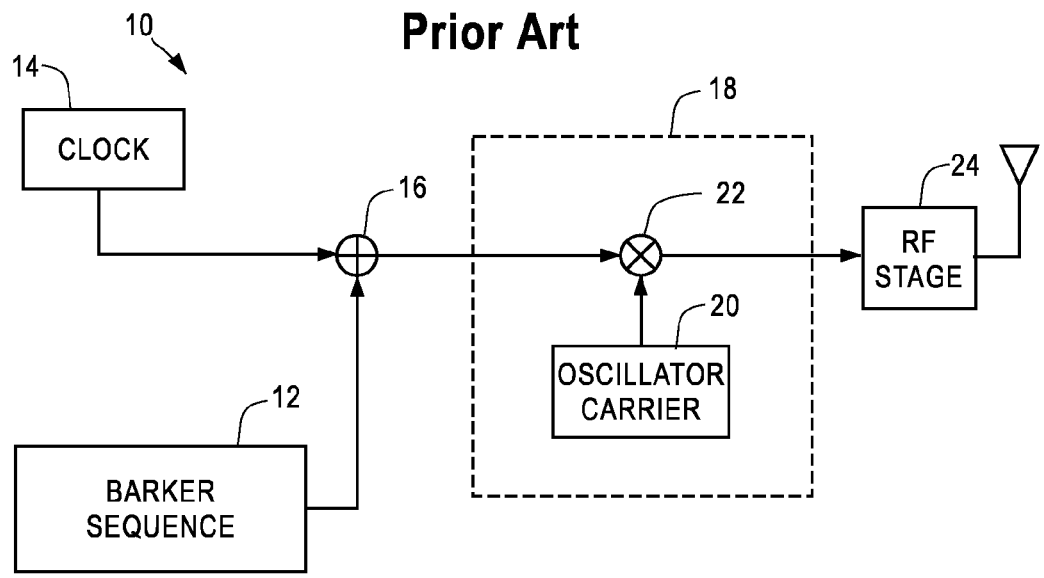
FIG. 1 shows the present prior art basic transmission technique of a spread spectrum system and particularly using an 11-bit Barker sequence, which by means of a exclusive OR function performs the spreading of the spectrum of the original data signal, wherein the bit frequency is 11 times lower to the one used for the Barker sequence, which makes it possible to obtain a processing gain of 10·log$_{10}$ (11)~10.4 dB.
Figure 1B:
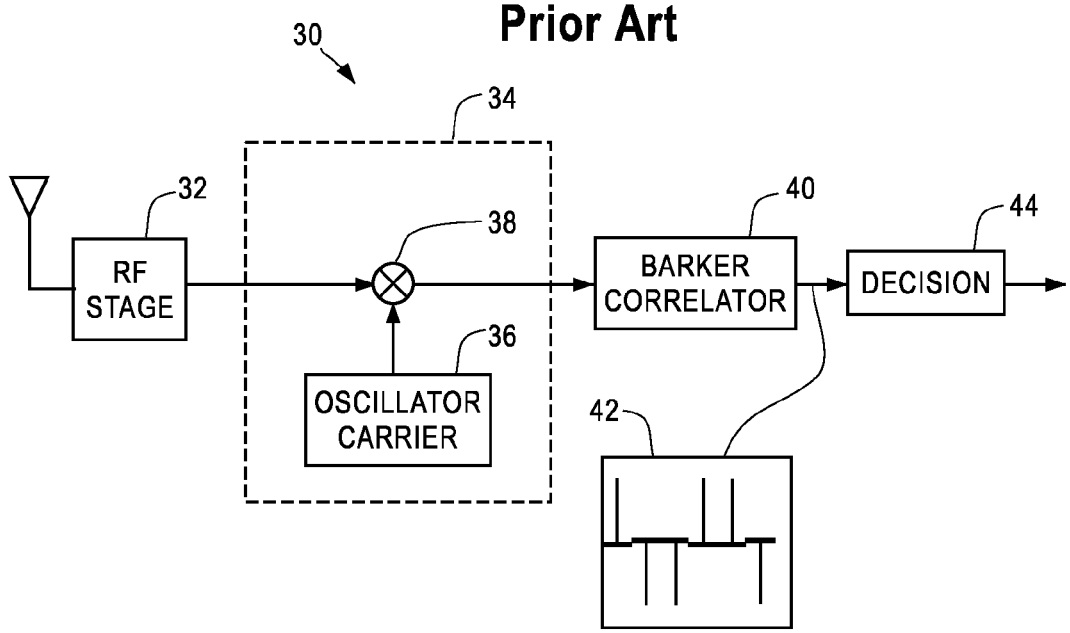

FIGS. 1A and 1B shows a block diagram of a prior art transmitter and receiver for a Direct Sequence Spread Spectrum (DSSS) communication system, respectively. In the examples of FIGS. 1A and 1B, the sequence used to spread the spectrum is a Barker sequence. A Barker sequence is a sequence of symbols which may vary in length but typically have a maximum length of 13 bits. When embedded in a string of randomly chosen symbols, Barker sequences have a close but not ideal autocorrelation. Barker sequences are used to check, and if necessary to correct, the synchronization and framing of received data.

FIG. 1A illustrates a transmitter 10 used to transmit a Barker sequence 12. The Barker sequence may be any valid Barker code of any proper length, typically between 2 and 13 bits. The barker sequence is summed with a clock 14 at a binary adder 16. The clock 14 may be run at any desired speed such as, for example, 1 MHz. The output at the adder 16 may be input into a modulator 18. The modulator 18 may be, for example, a Binary Phase Shift Key (BPSK) modulator. Of course, the modulator 18 may be any of a variety of modulators such as, for example, QPSK modulator, FSK modulator, QAM modulator, etc. These modulation techniques are well known in the art and will not be described further. The input from the adder 16 may be mixed with a carrier signal such as oscillator carrier 20 at mixer 22. The output of the mixer 22 may then be input into an RF stage 24 to be transmitted to a receiver. Although the transmitter is shown with an antenna, signifying a wireless transmission, the transmitter may also transmit the data by other means such as, for example, via coax cable, fiber, etc.

FIG. 1B illustrates an example receiver system 30 including an RF stage 32 which may be used to receive incoming data and, in some cases, convert the data into usable information. The data received at the RF stage 32 may then be input into a demodulator 34 such as, for example, a BPSK demodulator. The demodulator may be any of a variety of demodulators such as a QPSK demodulator, FSK demodulator, QAM demodulator, etc. The data may be mixed with an oscillator carrier 36 via mixer 38. The output of the demodulator 34 may be input into a Barker correlator 40 which may result in an output of autocorrelations such as, for example, the chart 42. The Barker correlation output may then be input into a decision block 44 and a final output is received and may be sent to another part of the system.

A possible embodiment of a method applied to an end-to-end open-air radio communication system is shown below. For reasons of clarity the implementation in this case of a QPSK transmitter (N=4) is outlined in FIG. 2, performing data modulation using η Golay sequences, amplitude modulated by means of A amplitudes. It will be noted that the values η and n may both be used. Therefore, by applying the formula (1.2), the transmission rate will be:

$$C = \eta \log_2 A \frac{B}{2} \text{ bits/seg.}$$

In accordance with what has been explained above, the starting point is a set of η pairs of Golay sequences of m bits generated and stored in the transmitter by means of, generally, 2×η binary registers (values 1 and −1) which we aim to amplitude modulate with A amplitudes and with 4 Q-PSK phases (4-PSK). In the same FIG. 2 one of the basic modulator blocks (BMB) of which the transmitter consists is shown in detail.

Figure 2:
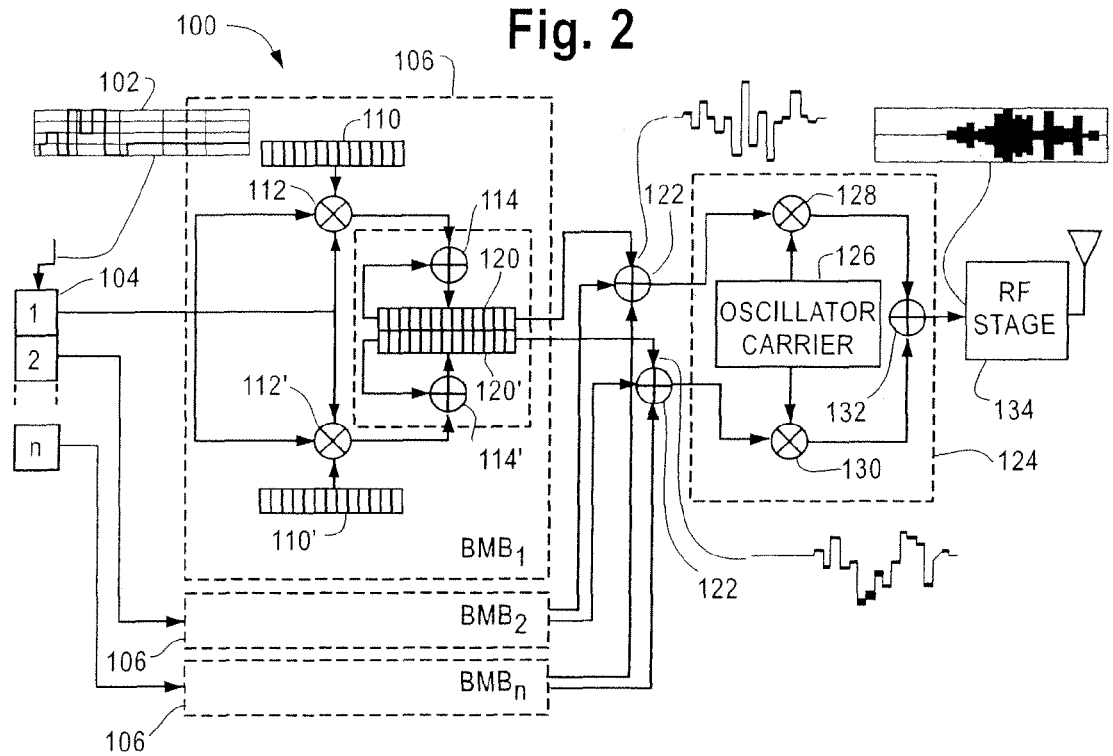
FIG. 2 shows the basic elements of a transmission method and a possible implementation of the transmitter.

FIG. 2 is an exemplary embodiment of a transmission method implementing the use of a transmitter using Golay sequences. The transmitter, generally, transmits data using the properties of orthogonal sets of Golay complementary sequences in order to improve the efficiency of any DSSS in terms of data rate and energy, among others. The transmission method may rely on properties of Golay complementary sequences.

FIG. 2 shows an example embodiment using η (n) sets of orthogonal or pseudo-orthogonal sequences including a transmitter 100 for transmitting data such as binary data shown in chart 102. The data 102 may be divided into symbols at encoder 104. The total amount of bits each symbol is composed of may depend on the number of simultaneous bits the system may need to send at one time. That is, the data 102 may be divided into n symbols each with a length of m bits and may also be encoded and divided into n symbols with m bits according to the equation $m=\log_2 A$ bits. Each symbol at encoder 104 may then be input into a Basic Modulator Block (BMB) 106. Each BMB 106 may process in parallel, a group of m bits or one symbol so that the transmitter 100 or system may transmit n×m bits per symbol. In the example of FIG. 2, only one BMB 106 is shown in detail, however, each BMB corresponding to each received symbol may have a similar architecture.

Figure 3:
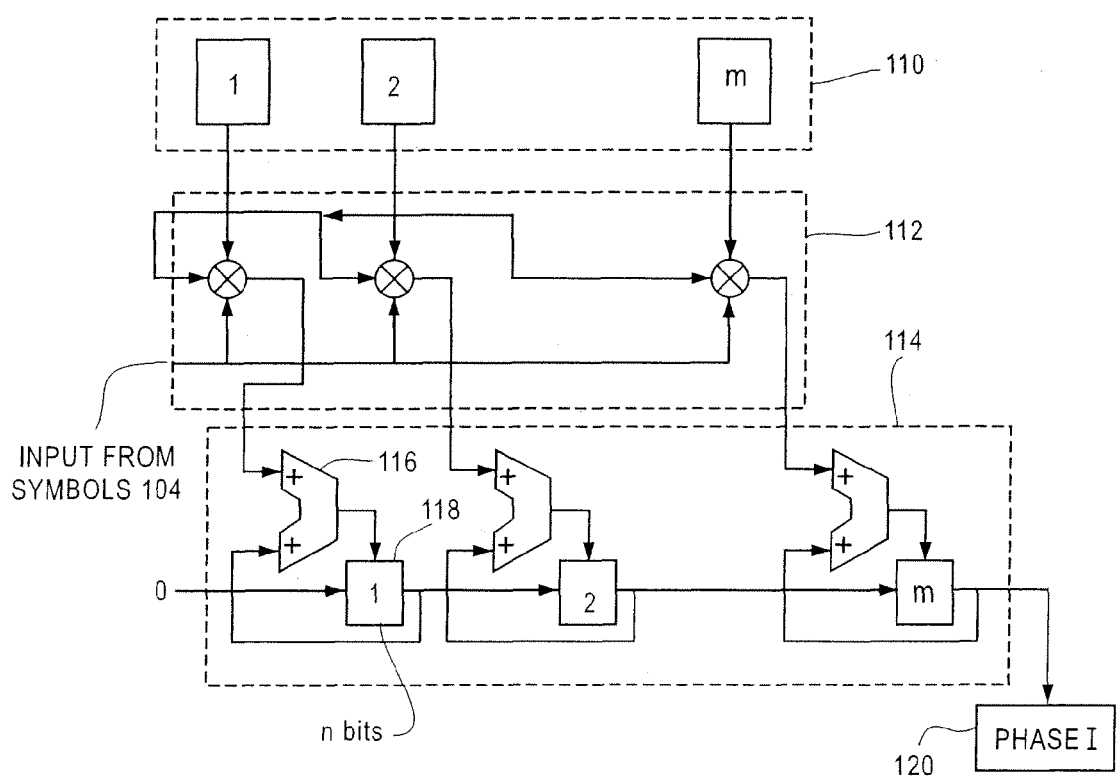
FIG. 3 corresponds to a possible embodiment of a basic modulator block, for the sake of simplification only the embodiment of phase I is shown.

Referring now to FIG. 3, FIG. 3 shows a more detailed example of the architecture of the example BMB 106 shown in FIG. 2. Although described here as a BMB, FIG. 3 may also function as a basic demodulator block (BDB) and may have a similar architecture. For simplicity, only one phase of the BMB 106 is shown, however, as seen in FIG. 2, BMB 106 includes two phases, such as for example phases I and Q. Furthermore, for clarity, each of the elements for the phase shown in FIG. 3 is labeled as such in FIG. 2 while the complementary phase will be labeled with the same element number and a prime (') symbol. The BMB 106 may be designed to store Golay sequences used to encode and decode data. FIG. 3 includes Golay sequences 110, which may be stored in a Golay register, used to encode and decode the symbols 104, from FIG. 2. The Golay sequences 110 stored in the BMB 106 may be of length m corresponding to the length of the symbol inputted from encoder 104. Each bit of the Golay sequence may be multiplied at block 112, with each of the bits of each of the symbols 104. The output from each of the multipliers of the block 112, may be added and shifted by block 114. The block 114 may comprise double accumulators or adders 116 and shift registers 118: The shift register 118 may be formed by basic elements which store signal values, and therefore, the number of bits used in each basic element of said register 118, may be dimensioned to avoid overflow during the accumulation operations at adders 116. Thus, the number of elements in the shift register 118 may be equal to or higher than m for each of the phases. The block 114 may perform the arithmetic summing of the result of the multipliers 112 with the content of the shift register 118. The data may be added and shifted by a register to the right for each symbol cycle, thereby updating the register. The output from the adder block 114 may result in one phase of the data such as phase I 120. This filtering, for a BMB example, may be similar to a mathematical convolution of the data by the Golay sequence of block 110. In the example of a BDB, the stored Golay sequences 110 may be reversed in time, that is, this process may result in the equivalent of a mathematical correlation.

Referring back to FIG. 2, the output of each of the phases I and Q are each inputted into adder blocks 122. Each adder 122 independently sums up the data corresponding to the output of each shift register of each of the BMBs 106 thus obtaining the total for each phase such as, for example, $I_T$ and $Q_T$ signals which are afterwards modulated at modulator 124. Modulator 124, which may be, for example, a QPSK modulator may modulate the output signals from the adder 122 by multiplying the output signals of the adders 122 by, for example, two quadrature symbols, a sinusoidal symbol with phase $.\Phi_0$ (via for example $I_T$) and another quadrature $.\Phi_{0+\pi/2}$ (via for example $Q_T$) using oscillator carrier block 126. That is, in one example phase I and Q separated by $\pi/2$. Once modulated at mixers 128, 130, the resulting output of both phases may be added at adder 132, thus obtaining the transmission signal in for example, QPSK. The transmission signal may then be input to an RF or exit stage 134 which may consist of a D/A converter stage and a conventional radio frequency stage, for example, sending the signal to the transmission means.

Figure 4:
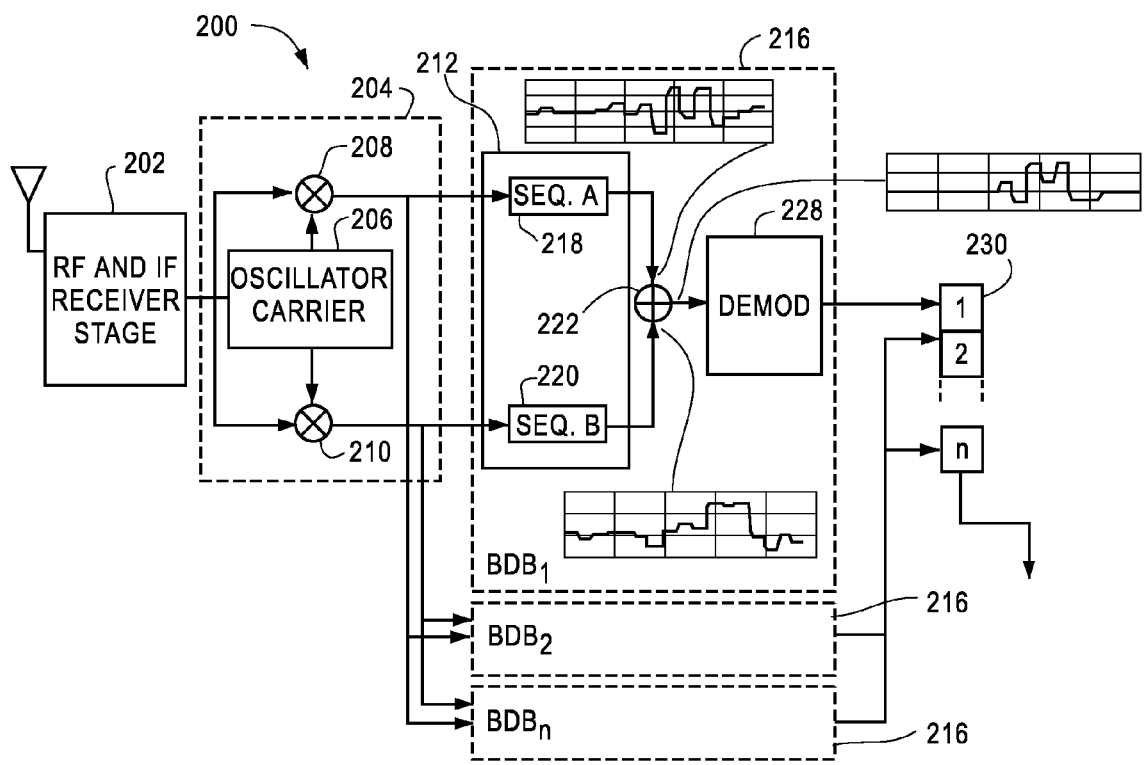
FIG. 4 shows a basic outline of a reception method and, particularly, an example of the receiver apparatus.

FIG. 4 shows a basic outline of a reception method and particularly an example of a receiver 200 formed by n BDBs. Receiver 200 may include a receiver stage 202 which may be, for example, a QPSK receiver. The receiver stage 202 may amplify the RF input signal received from transmitter 100 and if necessary convert the signal to an intermediate frequency (IF). The receiver stage 202 may then obtain phase information to demodulate and recover the different flows in-phase I and Q corresponding to the phases $\Phi_0$ and $.\Phi_{0-\pi/2}$ at demodulator 204 The demodulator 204 may include oscillator carrier block 206 used to modulate the received signal at mixers 208, 210 into their I and Q components. The I and Q signals may be digitised and their output passed on to the correlator blocks 212 within BDB 214. This block may be common for all the BDBs.

As with the description of FIG. 2 above, the demodulated signal may be separated into symbols each of m bits. Each of the digitized symbols may be input separately into their corresponding BDBs as shown in FIG. 4, similar to the inputs of encoders 104 of FIG. 2. Each BDB 216 may include Golay correlators 212. The correlators 212 make it possible to correlate the different flows received with their corresponding Golay sequences 218, 220. In some cases, the sequences may be normalized, thus, reducing the correlation to performing addition and subtraction of the symbol with Golay sequences 218, 220. The Golay sequences 218, 220, as described above, may be reversed in time which is defined mathematically as a correlation. Each of the correlators may output data corresponding to each phases' Golay sequence and may then be added at adder 222. The adder 222 may perform the adding up of the correlations so that the results are the original amplitude modulated data. The outputs may be thresholded and converted into binary data at demodulator and detector block 228 which generates the data at a specific symbol rate at the output of each block. Following the BDB 216 a decoder 230 such as, for example, a pulse amplitude demodulator decoder, may perform the grouping of the symbols received within the data stream, corresponding to the transmitted data in the order in which they were transmitted.

The invention claimed is:

1. A method for spread spectrum digital communication by Golay complementary sequence modulation, comprising:
receiving information comprising binary data for transmission through a communication channel;
encoding and dividing said received binary data into symbols for spread spectrum transmission;
modulating and encoding each symbol separately using Golay complementary sequences to generate a Golay sequence modulated binary data signal by (a) generating η binary Golay sequences and encoding each symbol of said received binary data with one of the η binary Golay sequences as entry data with low cross-correlation of the Golay sequences to generate an output signal, and (b)

modulating said output signal with N-PSK modulation to generate the Golay sequence modulated binary data signal;

using a double accumulator and shift register, including elements accumulating and displacing said sequences generated in order to obtain different phases; and transmitting said Golay sequence modulated binary data signal through said communication channel.

2. The method according to claim 1, wherein said transmission of information occurs by generating binary sequences for spread spectrum application which use said Golay complementary sequences which are normalized between +1 and −1.

3. The method according to claim 1, wherein said transmission of information occurs by use of a transmitter generating said binary sequences for spread spectrum applications by multiplying said Golay complementary sequences modulated by said amplitude values A, representing digital input, thereby multiplying a quantity of information bits per symbol interval by $m=\log_2 A$.

4. The method according to claim 1, further comprising the step of generating binary sequences of spread spectrum applications, thereby generating a processing gain in decibels equal to: $10 \log_{10}(2M)$ dB, where M is the length of said selected Golay sequences.

5. The method according to claim 1, further comprising the steps of adding with an adder all elements generated in said phases, whether said elements are generated all together, or in any combination thereof, and obtaining the signals which are subsequently modulated by means of said N-PSK modulation and which said signals are transmitted through a transmission medium by means of a conventional radio frequency stage.

6. The modulation method according to claim 5, wherein step modulates and transmits information at a transmission rate of $C=\eta \log_2 A \cdot \frac{1}{2} \log_2 N \cdot B/2$ bits/second, where $\eta$ is defined as the number of Golay pairs used, A is defined as the number of amplitudes used to modulate the input data, N (power of 4) is defined as the number of phases used in the modulation and B is defined as the null-to-null bandwidth used in the N-PSK modulation.

7. The method for spread spectrum digital communication by Golay complementary sequence modulation according to claim 1, wherein each of the symbols include M bits corresponding to the M bits of the Golay sequence.

8. The method for spread spectrum digital communication by Golay complementary sequence modulation according to claim 1, wherein the Golay complementary sequences are stored in a register in a modulator block.

9. The method for spread spectrum digital communication by Golay complementary sequence modulation according to claim 1, wherein the step of modulating and encoding each symbol separately using Golay complementary sequences occurs in a modulator block.

10. The method for spread spectrum digital communication by Golay complementary sequence modulation according to claim 1, wherein each of the symbols encoded by the complementary Golay sequences for each of the $\eta$ binary Golay sequences are added by phase.

11. A method for spread spectrum digital communication, comprising the steps of:

providing a plurality of bits that are representative of a signal to be transmitted through a communications channel;

separating the plurality of bits into n groups of M bits;

providing a number of Golay complementary sequences equal to n;

for each Golay complementary sequence, separately convolving the bits of each group with at least first and second sequences that form each one of the Golay complementary sequences;

adding together the bits of each group that are convolved with the first sequence of each one of the Golay complementary sequences to produce a first signal;

adding together the bits of each group that are convolved with the second sequence of each one of the Golay complementary sequences to produce a second signal;

modulating the first and second signals; and transmitting the modulated first and second signals over the communications channel.

12. The method of claim 11, wherein each Golay complementary sequence is formed by only two different sequences.

13. The method of claim 11, wherein each one of the Golay complementary sequences are normalized between +1 and −1.

14. The method of claim 11, further comprising the step of using a double accumulator and shift register, including elements accumulating and displacing said Golay complementary sequences generated in order to obtain different phases.

15. The method of claim 11, wherein the first and second signals are modulated using N-PSK modulation.

16. The method of claim 11, wherein each group of bits has the same number of M bits per group.

17. The method of claim 11, wherein the Golay complementary sequences are stored in a register in a modulator block.

* * * * *

UNITED STATES PATENT AND TRADEMARK OFFICE
CERTIFICATE OF CORRECTION

| | |
|---|---|
| PATENT NO. | : 7,711,032 B2 |
| APPLICATION NO. | : 10/344426 |
| DATED | : May 4, 2010 |
| INVENTOR(S) | : Vicente D. Fuente |

It is certified that error appears in the above-identified patent and that said Letters Patent is hereby corrected as shown below:

Title Page

At Item (57), line 1, "spreaded" should be -- spread --.

At Column 1, line 23, "allows to" should be -- allows it to --.

At Column 7, lines 33-34, claim 6 "wherein step" should be -- wherein said transmission step --.

Signed and Sealed this

Third Day of August, 2010

David J. Kappos
*Director of the United States Patent and Trademark Office*